F. R MOORE.
AUTOMOBILE INDICATOR.
APPLICATION FILED AUG. 12, 1921.

1,419,467.

Patented June 13, 1922.
5 SHEETS—SHEET 1.

Fred R. Moore
INVENTOR.

BY
ATTORNEYS.

F. R MOORE.
AUTOMOBILE INDICATOR.
APPLICATION FILED AUG. 12, 1921.

1,419,467.

Patented June 13, 1922.
5 SHEETS—SHEET 5.

Fred R. Moore
INVENTOR.

BY
ATTORNEYS.

UNITED STATES PATENT OFFICE.

FRED R. MOORE, OF CHICAGO, ILLINOIS.

AUTOMOBILE INDICATOR.

1,419,467.

Specification of Letters Patent. Patented June 13, 1922.

Application filed August 12, 1921. Serial No. 491,812.

*To all whom it may concern:*

Be it known that I, FRED R. MOORE, a citizen of the United States, residing at Chicago, in the county of Cook and State of Illinois, have invented new and useful Improvements in Automobile Indicators, of which the following is a specification.

This invention relates to signal apparatus employed in connection with motor vehicles to indicate stops as well as the direction in which the car is about to make a turn, and the object of the invention is to provide a mechanically operated apparatus of this kind embodying certain novel and improved features of construction and operation as will be pointed out in the detailed description appearing hereinafter.

In order that the invention may be better understood, reference is had to the accompanying drawings, forming a part of this specification, and in which:—

Fig. 4 is an enlarged interior view of Fig. 2, a side cover plate being removed.

Figure 2:
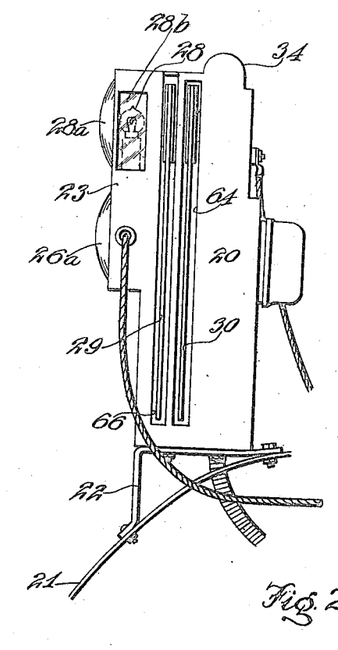
Fig. 2 is a side elevation.
Figure 3:
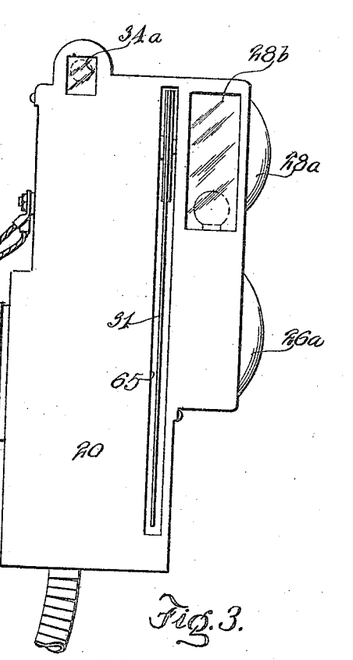
Fig. 3 is an enlarged elevation viewed from the opposite side.
Figure 5:
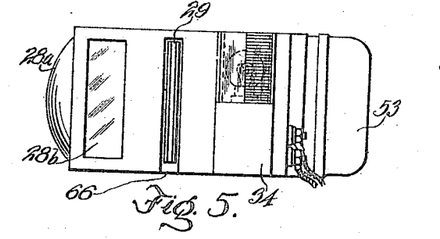
Fig. 5 is a plan view.

Referring specifically to the drawings, the apparatus is carried in a housing 20 suitably supported at the rear of the car. A convenient place may be one of the rear fenders shown at 21 in Fig. 2, the same carrying a base bracket member 22 to which the housing is suitably secured.

The rearwardly facing end of the housing is formed with a lamp chamber 23 divided by a partition $23^a$ into top and bottom compartments 24 and 25, the latter containing the usual tail lamp 26 which is visible through a rear red lens $26^a$, and also sheds its light through a lens $26^b$ fitted to the bottom of the compartment, to illuminate the license plate 27 below. The partition $23^a$ keeps the light of one lamp from the other.

The top compartment 24 contains a lamp 28 which is visible through a rear red lens $28^a$. The compartment also has side and top openings fitted with glass sights $28^b$ so that the light from the lamp 28 is also projected from the top and from both sides of the compartment 24, this being for the purpose of illuminating the signal arms 29, 30 and 31 to be presently described, the same being positioned so that their display sides are to the rear of the compartment.

The housing 20 is divided by a vertical partition $20^a$ into separate compartments 32 and 33, the former serving to house the signal arms 29, 30 and 31 when they are in non-display position, and the latter containing the actuating mechanism of said arms.

At the top of the compartment 33 is a dome shaped housing 34 containing a lamp 35. That side of the housing which faces the signal arms 29, 30 and 31 is a white transparency to illuminate the sides of the arms facing the front of the car, whereas the side of the housing which faces in the direction of the front of the car is tinted red to attract the attention of drivers and pedestrians ahead to the signals. The housing 34 also has a small side window $34^a$ to illuminate the arm 31.

Figures 7, 8:
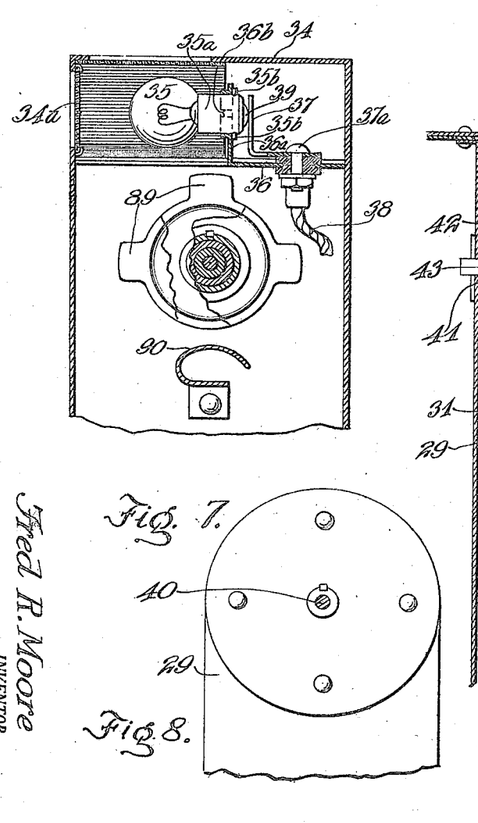
Fig. 7 is a sectional detail on the line 7—7 of Fig. 6.
Fig. 8 is a face view showing the inner end of a signal arm.

The several lamps described are incandescent electric lamps the bulbs being of standard design. Fig. 7 discloses a simple and inexpensive support for the lamp bulb 35, the purpose being to eliminate the expense of a socket. The floor 36 of the compartment 33 has an upward bend $36^a$ provided with a hole to receive the bulb base $35^a$, the latter having two diametrically opposite outstanding studs $35^b$ as usual, and in order that these may pass through the hole in the part $35^a$, the edge of said hole has diametrically opposite notches $36^b$. After the bulb base is passed through the hole, the bulb is turned to take the studs out of registering position relative to the notches, which completes the attachment, a reversal of this operation permitting removal of the bulb. The bulb base is held firm by the pressure of a spring tongue 37 against the rear end thereof, said spring tongue being carried by a binding post 37ª. The lamp wire 38 leads to the binding post 37ª, and the spring tongue 37 is in electrical connection therewith and also seats against the lamp contact 39, the other contact being a grounded one as usual. A similar connection is provided for the other lamp bulbs.

Figure 1:
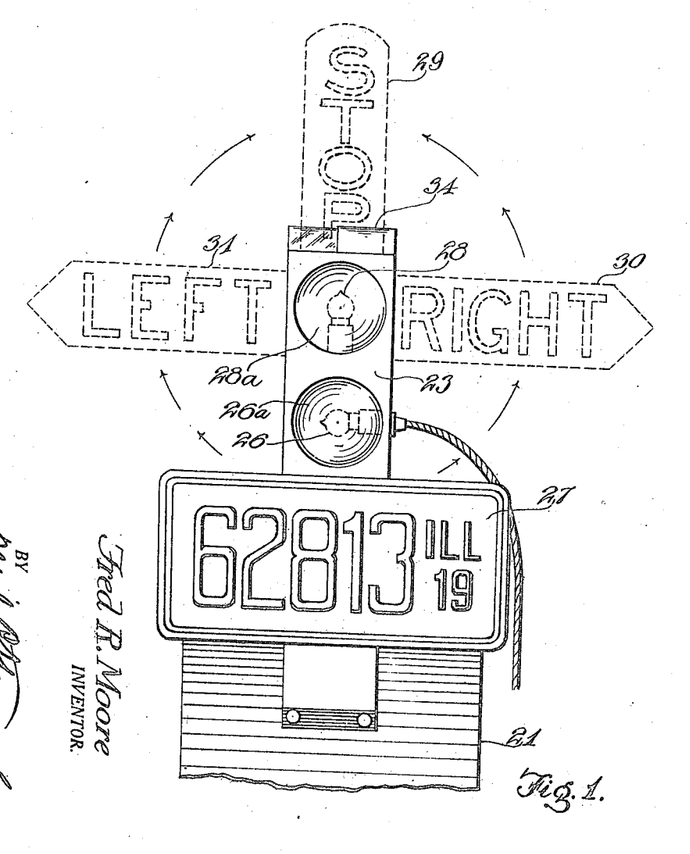
Figure 1 is an elevation of the apparatus as viewed from the rear of the car.

Through the front and rear walls of the housing 20, as well as through the partition 20ª, passes a stationary shaft 40 which supports sleeves 41, 42 and 43, loosely mounted one inside the other, and of different lengths, the innermost sleeve 41 being the longest and the outermost sleeve 43 the shortest. The sleeve 41 carries the signal arm 31, sleeve 42 carries signal arm 29, and sleeve 43 carries signal arm 30. Signal arm 29 contains the inscription "stop," signal arm 30 the inscription "right," and signal arm 31 the inscription "left." It will be understood that any other inscriptions may be employed. The arms are sheet metal plates of suitable length having reinforced edges, the outer ends of arms 30 and 31 being pointed, whereas the outer end of arm 29 is rounded as shown in Fig. 1. Of course the arms may be given any other shape, such as an arrow, etc.

The sleeves carrying the signal arms extend into the compartment 33, and they are here provided with grooved pulleys, the pulley of sleeve 41 being shown at 41ª, the pulley of sleeve 42 at 42ª and the pulley of sleeve 43 at 43ª.

Beneath the pulleys 41ª, 42ª and 43ª, the walls of compartment support a shaft 44 which carries grooved pulleys 45, 46 and 47 having a pawl-and-ratchet driving connection with the shaft. The ratchet wheels 48 are keyed or otherwise fastened to the shaft 44, as shown at 48ª, and the pawls 49 are spring-backed and carried by the pulleys. It will therefore be evident that the rotation of either one of the pulleys associated with shaft 44 will rotate the latter.

Figure 9:
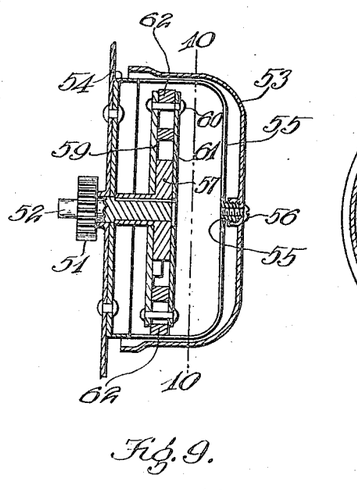
Fig. 9 is a longitudinal section of a bell.
Figure 10:
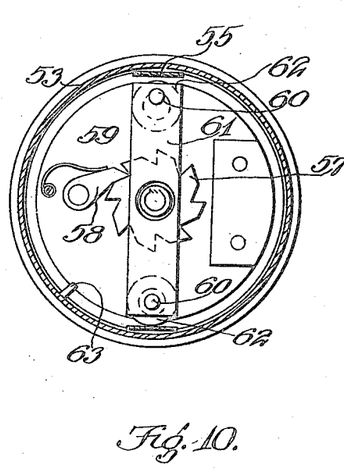
Fig. 10 is a cross-section on the line 10—10 of Fig. 9.

On shaft 44 is a spur gear 50 which is in mesh with a pinion 51 on the spindle 52 of a bell, the shell of which latter is shown at 53. The base of shell 53 has a dust-excluding backing plate 54 which is formed with an arch 55 extending into the shell and having a central boss 55ª on which the shell screws, as shown in Fig. 9, with a left-handed screw 56 passing through the shell and threaded into the boss to complete the fastening. Any tendency of the shell 53 to unscrew is prevented by the screw 56, as it would result in tightening of the latter.

The bell spindle 52 has a ratchet wheel 57 which is engaged by a spring-pressed pawl 58 carried by a disk 59 which is loose on the hub of the ratchet wheel, and supports, by means of pins 60, a spaced cross bar 61, the ratchet wheel being located between said disk and cross bar. On the pins 60 are loosely hung striker rings 62, which latter, when they are being carried around by the rotating cross bar, hit a projecting 63 inside the shell 53. The bell is sounded when the spindle 52 is rotated, and by reason of the pawl-and-ratchet driving connection between said spindle and the support of the strikers 62, said support continues to rotate to keep up the sounding of the bell for some length of time after the spindle has ceased to turn.

Figure 6:
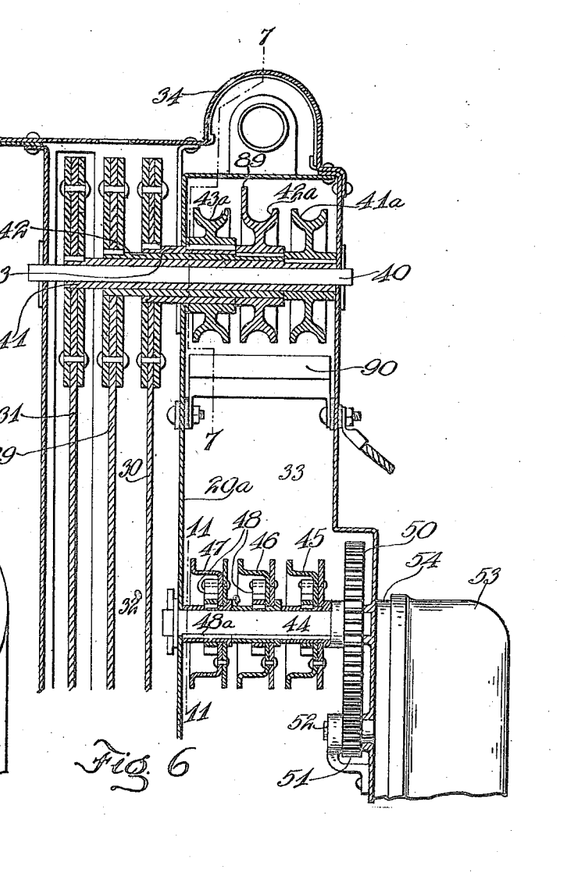
Fig. 6 is an enlarged section of the upper part of Fig. 2.

The signal arms 29, 30 and 31 are designed to be operated by a driving means connected to the pulleys 41ª, 42ª and 43ª of their supporting sleeves or hubs 41, 42 and 43. The "left" and "right" arms are adapted to be swung in corresponding directions into horizontal position, in which position they project from the housing 20 as shown dotted in Fig. 1. The housing 20 has a side slot 64 through which the arm 30 swings, and on the opposite side is a slot 65 through which the arm 31 swings. The first mentioned side of the housing also has a slot 66 through which the "stop" arm 29 swings, said slot being continued through the top of the housing 20 that this arm may be swung through an arc of 180 degrees and come to an erect position when it is to be displayed, as shown dotted in Fig. 1. In non-display position, the three arms are in pendent position within the compartment 32 of the housing, as shown in Figs. 4 and 6.

Figures 11, 12:
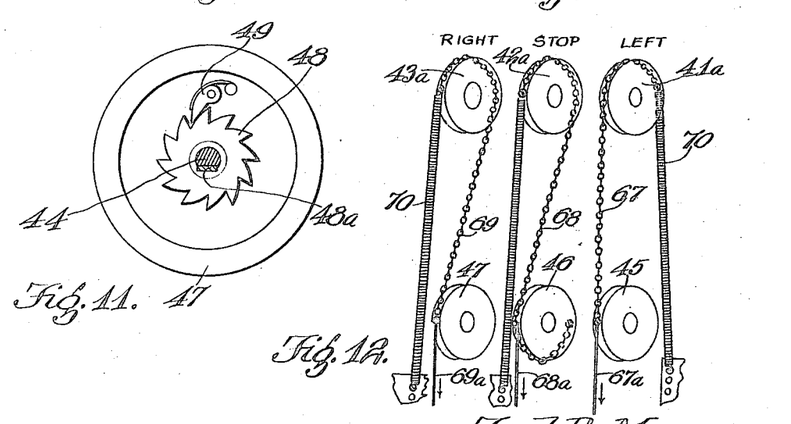
Fig. 11 is an enlarged cross-section on the line 11—11 of Fig. 6.
Fig. 12 is a diagrammatic view of the means by which the signal arms are operated.

The means for swinging the signal arms to display position consist of flexible members so connected to the pulleys 41ª, 42ª and 43 that when said members are given a pull, the pulleys turn and as said pulleys are operatively connected to the signal arms through the sleeves 41, 42 and 43, it will be evident that this operation swings the signal arms to display position, the pulleys being rotated an angular distance sufficient to bring the signal arms to proper display positions. The flexible members referred to may be chains as shown at 67, 68 and 69 in Fig. 12. The chain 67 is connected to pulley 41ª, chain 68 is connected to pulley 42ª and chain 69 to pulley 43ª. The chains are made fast at one end to the pulleys and they are wound partly thereon in a direction to rotate the pulleys in the proper direction to swing the signal arms to display positions. The chains are connected at their other ends to the pulleys 45, 46 and 47 so as to operate said pulleys at the same time the pulleys 41ª, 42ª and 43ª are operated, and thereby cause the bell 53 to be sounded simultaneously with the setting of the signal arms in display position. For the purpose of restoring the signal arms to non-display position there is connected to each pulley 41ª, 42ª and 43ª a coiled spring 70 which is expanded when said pulleys are rotated to place the signal arms in display position, and hence when the chains 67, 68 and 69 are released the springs contract and rotate the pulleys in a direction to restore the signal arms to non-display position. The signal arms therefore do not depend on gravity for restoration to non-display position, and hence they can be made of light material, such as sheet metal.

To the ends of the chains 67, 68 and 69 which are connected to the pulleys 45, 46 and 47 are connected flexible actuating means 67a, 68a and 69a for said chains, which means may be wires, cables or the like. These actuating wires lead to a control mechanism shown in Figs. 13 to 16, said mechanism being located within easy reach of the driver, such as alongside the steering post of the car. The control mechanism comprises the following parts:

A vertically reciprocatory and rotatable shaft 71 has its upper end provided with a forwardly extending hand grip 72, and said shaft passes through a bearing 73 in the car floor 74, from which latter depends a frame having vertically spaced horizonal members 75 through which the shaft also passes. To the lower end of shaft 71 is fastened the actuating wire 68a. The lower frame member 75 carries a guide pulley 76 for the wire 68a, and as this wire controls the actuation of signal arm 29, it will be seen that said arm is swung to display position when shaft 71 is pushed down by the hand grip 72. The descent of shaft 71 is resisted by a spring 77, and in order to hold the shaft in lowered position so that the "stop" arm 29 may remain in display position as long as desired, a latch device is provided, consisting of an abutment 78 on the shaft, said abutment being engaged and held by a spring latch 79 provided with a foot pedal 79a for tripping the same to release the abutment 78 and allow the shaft 71 to be pushed up to its normal position by the spring 77. The abutment 78 is adjustably mounted on shaft 71 and locked thereto by a set screw 78a, and it also serves to support a current wire 80 leading to a tell-tale lamp 81 associated with the hand grip 72, the same having a recess to seat the lamp and its forward end being equipped with a red lens 82 through which the lamp shines.

The lower end of the shaft 71 is squared or of other angular cross-section, and passes through a horizontally positioned disk 83 having a peripheral groove in which seats and is secured a steel or other flexible strap 84, as shown at 84a, which passes partly around the disk periphery and has its two ends extending therefrom in the same direction but on opposite sides of the center of the disk. One end of the strap is secured to the wire 67a, and the other end to the wire 69a. It will therefore be evident that when the disk 83 is swung in one direction the wire 67a is pulled to place the signal arm 30 in display position, and when the disk is swung in the opposite direction, the wire 69a is pulled to place the signal arm 31 in display position. The disk 83 is swung by rotating the shaft 71 by the hand grip 72. The connections are arranged in such a manner that a swing of the hand grip to the left swings the "left" signal arm to display position, whereas a swing of the hand grip to the right places the "right" signal arm in display position.

Figure 15:
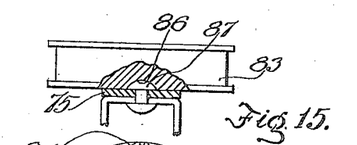
Fig. 15 is an elevation, partly in section of one of the elements of the control device.

The disk 83 is positioned between the frame members 75 and it is slidable on shaft 71, its top being pressed by a spring 85 so that it is urged in the direction of the lower frame member 75. The under side of the disk has three depressions 86 adapted to seat a locking lug 87 which may be the head of a rivet as shown in Fig. 15. When the lug 87 seats in the middle depression the disk 13 is in neutral position, and when it is swung sidewise to operate the signal arms 30 and 31 the lug enters a corresponding side depression to lock the disk, the locking action being effected by the spring 85 which holds the disk seated over the lug as shown in Fig. 15. When the disk is swung to allow the signal arm to come back to non-display position, the disk yields to clear the lug, and when the latter comes opposite the middle depression the disk is forced by the spring to engage said depression over the lug, thereby again locking the disk in neutral position.

The hand-grip 72 affords a very convenient means for controlling the signal arms, being more readily operated than a push-button switch, and it can be easily grasped and operated even if the driver is wearing gloves.

Figure 13:
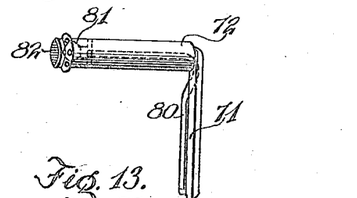
Fig. 13 is a perspective view showing the operating handle of a control device.
Figure 14:
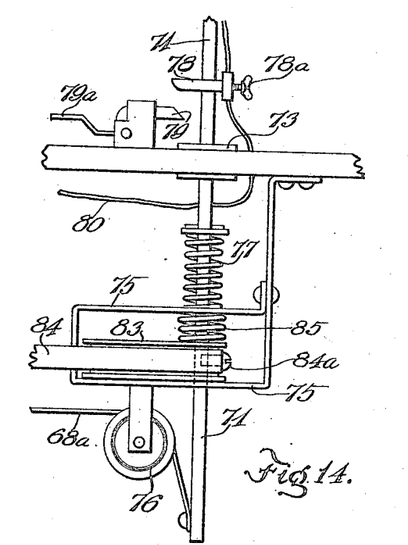
Fig. 14 is an elevation of said control device.

Fig. 13 shows at 88 a source of electricity for the lamps 26, 28, 35 and same being suitably wired to said source. The lamp 26 is separately wired to the source 88, whereas the lamps 28 and 35 are interposed in a circuit which is controlled by the signal arms 29, 30 and 31, the object being to turn on these lamps when either signal arm is swung to display position. In order that this may be done, each pulley 41a, 42a and 43a is provided at its periphery with a radially projecting contact finger 89 which bears down on a contact plate 90 located in the path thereof and supported by the partition 20a and the rear wall of the housing 20, it being understood that this action takes place when the pulley is operated to place its corresponding signal arm in display position, and when the pulley is swung to restore the signal arm to non-display position, the finger leaves the plate to break the circuit of the lamps 28, 35 and 81. It will be understood of course that the lamp circuits are suitably wired to the contact plate 90, and as the wiring is immaterial and well understood by those skilled in the art, it need not be described in detail. The lamp 81 associated with the hand grip 72 enables the driver to perceive whether the signal has been set, and it also serves as a reminder to restore the signal to non-display position when the stop or the turn has been made. As the bell 53 also rings when either signal arm is set in display position attention is attracted to the signal, and the driver is also notified that the signal has been set.

The wire 68ª controlling the "stop" signal arm 29 can be easily tightened up without getting under the car, or even leaving the seat, by adjusting the stop abutment 78 on the shaft 71.

Figure 16:
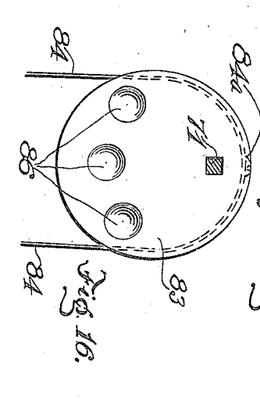
Fig. 16 is an inverted plan view of said device.
Figure 17:
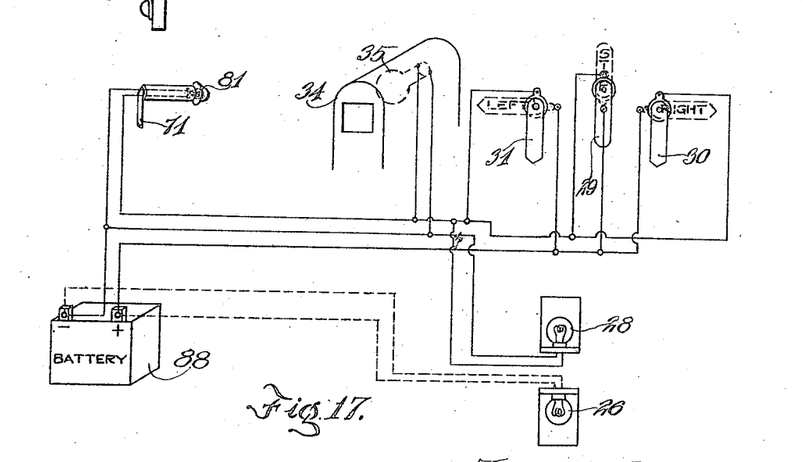
Fig. 17 is a wiring diagram of certain lamp circuits.

It will be noted by referring to Fig. 16 that the shaft 71 does not pass through the center of the disk 83, but that the latter is eccentrically positioned on the shaft. This arrangement gives the disk a large radius of action and one which is obviously much greater than if the disk were concentric with the shaft. This added distance of travel will be more than ample to take care of any looseness in the flexible actuating connections which may be present from stretching or improper installation. The only thing necessary to be done would be to turn the hand grip 72 through a slightly greater distance. The hand-grip 72 gives the disk 83 sufficient leverage to operate the signal arms 30 and 31 irrespective of the remote position of the latter from the disk. Inasmuch as the signal arms and the actuating pulleys and associate parts are in separate compartments, dust and dirt are kept away from the actuating parts. The contact 90 is engaged by the fingers 89 with a wiping action, and hence the parts are made self-cleaning by friction. The contact 90 is in the form of a bowed spring as shown in Fig. 7, and when engaged by the fingers 89, the tension assists to maintain a tight contact.

As there is nothing in the compartment 32 besides the signal arms 29, 30 and 31 to take up space, said arms may be given the full width and nearly the full height of the compartment, and this enables the arms to be made amply large so as to be clearly visible at considerable distance, and at the same time the housing 20 is kept within reasonable dimensions.

I claim:

1. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, a member connected to the shaft and adapted to be swung in opposite directions by rotation of the shaft, and connections between said member and the other element for selectively operating the same.

2. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, means for locking the shaft when moved in said direction, a member connected to the shaft and adapted to be swung in opposite directions by rotation of the shaft, and connections between said member and the other elements for selectively operating the same.

3. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, means for locking the shaft when moved in said direction, a spring for moving the shaft in the opposite direction when released, a member connected to the shaft and adapted to be swung in opposite directions by rotation of the shaft, and connections between said member and the other elements for selectively operating the same.

4. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, a member connected to the shaft and adapted to be swung in opposite directions by rotation of the shaft, said shaft being slidable relative to said member, and connections between said member and the other elements for selectively operating the same.

5. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, a disk through which the shaft slidably passes, said disk being eccentrically positioned relative to the shaft and adapted to be swung in opposite directions by the rotation of the shaft, a flexible member connected to the periphery of the disk and projecting therefrom on opposite sides of its center, and connections between said projecting ends of the flexible member and the other elements for selectively operating the same.

6. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, a disk through which the shaft slidably passes, said disk being eccentrically positioned relative to the shaft and adapted to be swung in opposite directions by the rotation of the shaft, a flexible member connected to the periphery of the disk and projecting therefrom on opposite sides of its center, connections between said projecting ends of the flexible member and the other elements for selectively operating the same, and locking means associated with the disk for holding the same stationary in the positions it is adapted to be swung.

7. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, means for locking the shaft when moved in said direction, a spring for moving the shaft in the opposite direction when released, a member connected to the shaft and adapted to be swung in opposite directions by rotation of the shaft, connections between said member and the other elements for selectively operating the same, and locking means associated with the aforesaid member for holding the same stationary in the positions it is adapted to be swung.

8. The combination with a mechanism having a plurality of movable elements, of flexible operating means for said elements, a shaft which is rotatable and also movable in the direction of its length, a connection between the shaft and the operating means of one of the elements for actuating the same by the longitudinal movement of the shaft in one direction, a disk through which the shaft slidably passes, said disk being eccentrically positioned relative to the shaft and adapted to be swung in opposite directions by the rotation of the shaft, a flexible member connected to the periphery of the disk and projecting therefrom on opposite sides of its center, connections between said projecting ends of the flexible member and the other elements for selectively operating the same, locking means associated with the disk for holding the same stationary in the positions it is adapted to be swung, means for locking the shaft when moved in the first mentioned direction, and a spring for moving the shaft in the opposite direction when released.

9. The combination with a mechanism having a plurality of movable elements, of pulleys connected to said elements for actuating the same, flexible operating means attached to the pulleys, a shaft which is rotatable and also movable in the direction of its length, a connection between the shaft and the operating means of one of the pulleys for actuating the same by the longitudinal movement of the shaft in one direction, a member connected to the shaft and adapted to be swung in opposite directions by rotation of the shaft, and connections between said member and the operating means of the other pulleys for selectively operating the same.

10. The combination with a mechanism having a plurality of movable elements, of pulleys connected to said elements for actuating the same, flexible operating means attached to the pulleys, a shaft which is rotatable and also movable in the direction of its length, a connection between the shaft and the operating means of one of the pulleys for actuating the same by the longitudinal movement of the shaft in one direction, a disk through which the shaft slidably passes, said disk being eccentric on the shaft and adapted to be swung in opposite directions by rotation of the shaft, a flexible member connected to the periphery of the disk and projecting therefrom on opposite sides of its center, and connections between said projecting ends of the flexible member and the operating means of the other pulleys for selectively operating the same.

11. The combination with a mechanism having a plurality of movable elements, of pulleys connected to said elements for actuating the same, flexible operating means attached to the pulleys, a shaft which is rotatable and also movable in the direction of its length, a connection between the shaft and the operating means of one of the pulleys for actuating the same by the longitudinal movement of the shaft in one direction, a disk through which the shaft slidably passes, said disk being eccentric on the shaft and adapted to be swung in opposite directions by rotation of the shaft, a flexible member connected to the periphery of the disk and projecting therefrom on opposite sides of its center, connections between said projecting ends of the flexible member and the operating means of the other pulleys for selectively operating the same, means for locking the shaft when moved in the first-mentioned direction, and a spring for moving the shaft in the opposite direction when released.

12. The combination with a mechanism having a plurality of movable elements, of pulleys connected to said elements for actuating the same, flexible operating means attached to the pulleys, a shaft which is rotatable and also movable in the direction of its length, a connection between the shaft and the operating means of one of the pulleys for actuating the same by the longitudinal movement of the shaft in one direction, a disk through which the shaft slidably passes, said disk being eccentric on the shaft and adapted to be swung in opposite directions by rotation of the shaft, a flexible member connected to the periphery of the disk and projecting therefrom o nopposite sides of its center, connections between said projecting ends of the flexible member and the operating means of the other pulleys for selectively operating the same, means for locking the shaft when moved in the first-mentioned direction, a spring for moving the shaft in the opposite direction when released, and locking means associated with the disk for holding the same stationary in the positions it is adapted to be swung.

In testimony whereof I affix my signature.

FRED R. MOORE.